(12) United States Patent
Wadewitz

(10) Patent No.: US 6,703,234 B1
(45) Date of Patent: Mar. 9, 2004

(54) ANIMAL BODY COMPOSTING

(75) Inventor: Peter Wadewitz, Willunga (AU)

(73) Assignee: C S Associated PTY LTD, Glenelg East (AU)

( * ) Notice: Subject to any disclaimer, the term of this patent is extended or adjusted under 35 U.S.C. 154(b) by 0 days.

(21) Appl. No.: 09/868,765

(22) PCT Filed: Dec. 21, 1999

(86) PCT No.: PCT/AU99/01133

§ 371 (c)(1), (2), (4) Date: Aug. 2, 2001

(87) PCT Pub. No.: WO00/37393

PCT Pub. Date: Jun. 29, 2000

(30) Foreign Application Priority Data

Dec. 21, 1998 (AU) .............................................. PP7816
Sep. 29, 1999 (AU) .............................................. PQ3140

(51) Int. Cl.$^7$ ................................................. C05F 1/00
(52) U.S. Cl. ........................... 435/267; 435/266; 71/10; 422/29
(58) Field of Search .......................... 435/290.1, 290.2, 435/290.3, 290.4, 262, 266, 267; 71/8–10, 15; 422/29

(56) References Cited

U.S. PATENT DOCUMENTS

| | | | |
|---|---|---|---|
| 5,145,581 A | * 9/1992 | Novy et al. | 210/609 |
| 5,587,320 A | 12/1996 | Shindo et al. | 435/290.1 |
| 6,281,001 B1 | * 8/2001 | McNelly | 435/262 |

FOREIGN PATENT DOCUMENTS

| | | | |
|---|---|---|---|
| CA | 2114350 | 7/1995 | ........... C05F/17/00 |
| DE | CH 645 333 A5 | 9/1984 | ............. C05F/9/02 |
| DE | EP 0 371 385 A1 | 11/1989 | ............. C02F/3/20 |
| DE | 4021 868 A1 | 11/1991 | ............. C05F/9/00 |
| DE | 41 07 340 A1 | 9/1992 | ............. C05F/9/00 |
| DE | 19521 474 A1 | 11/1996 | ........... C05F/17/00 |
| EP | 0 599 661 A1 | 11/1993 | ........... C05F/17/02 |
| EP | 0 647 604 A1 | 9/1994 | ........... C05F/17/00 |
| JP | 60235782 A | * 11/1985 | ........... C02F/11/02 |
| JP | 03237081 A | * 10/1991 | ........... C05F/17/02 |
| JP | 11077001 A | * 3/1999 | ............. B09B/3/00 |
| WO | WO 9009964 A1 | * 9/1990 | ............. C02F/3/02 |
| WO | WO 9200258 A1 | * 1/1992 | ............. C05F/1/00 |
| WO | WO 9631450 A1 | * 10/1996 | ........... C05F/17/02 |
| WO | WO 9724933 A1 | * 7/1997 | ............. A23J/1/04 |

OTHER PUBLICATIONS

Plant And Method For Cleaning And Cooling Of Recirculated Air During Composting And Use Of Such A Plant Or Method. International Publication No. WO 96/07624; Mar. 14, 1996.

* cited by examiner

Primary Examiner—William H. Beisner
(74) Attorney, Agent, or Firm—Dinnin & Dunn, P.C.

(57) ABSTRACT

A method of composting especially high protein waste which reduces noxious odor and assists in reducing pathogens by recirculating substantially only the air and gaseous product of the composting process through the composting materials which are separated by layers of absorbent chips.

14 Claims, 2 Drawing Sheets

ANIMAL BODY COMPOSTING

Figure 1:
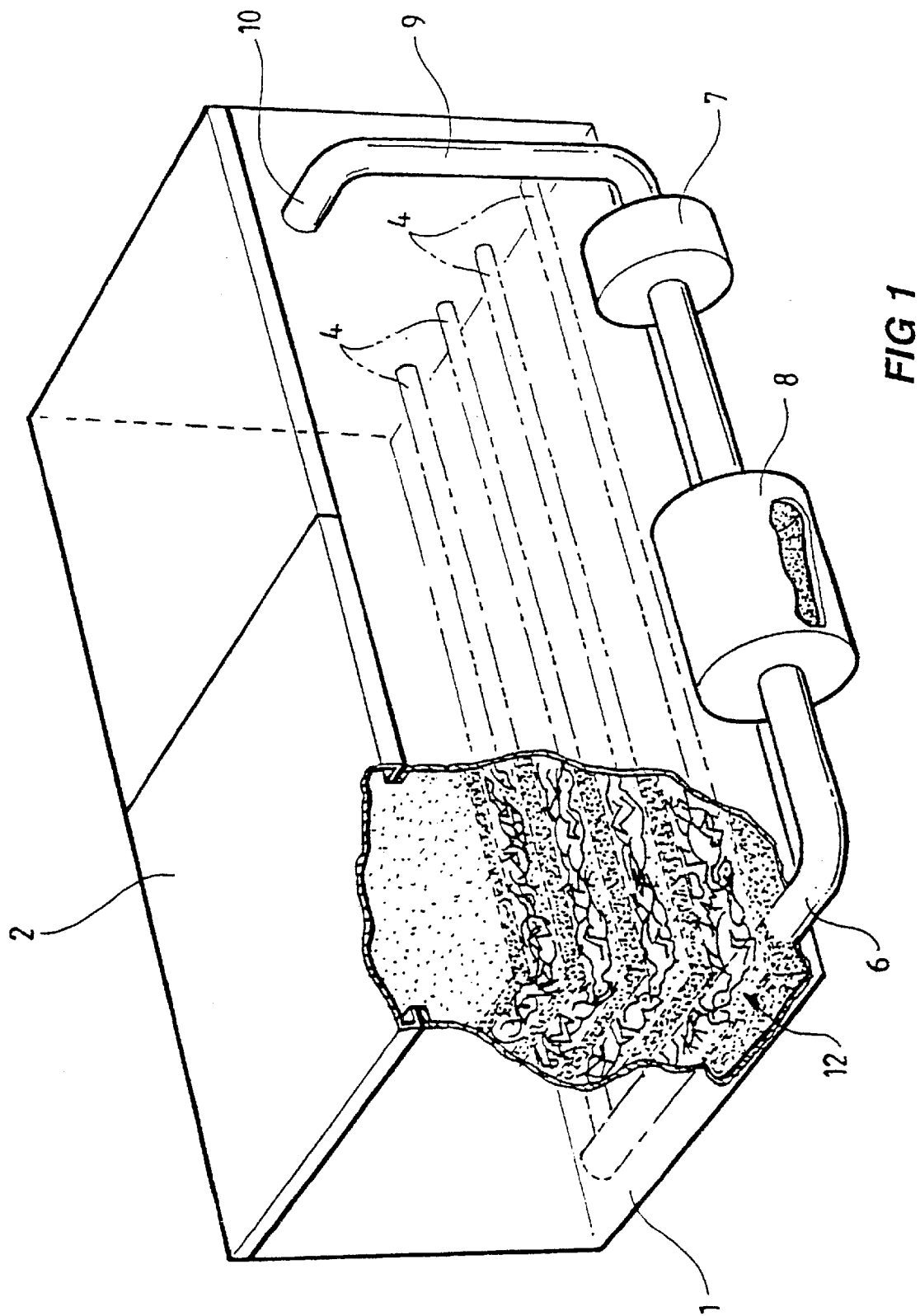

This invention relates to a method and apparatus for composting waste and for compost resulting from such method and use of such apparatus.

It is currently known to dispose of animal bodies such as poultry by depositing these in an essentially open container and letting these decompose.

A number of problems exist with current composting practices a first of these being a problem of obnoxious smell, a second problem relates to biosecurity where infections resulting in pathogens, can be either released or cross infect other environs, and a further problem relates to disposal of material even when composted if it is not biologically safe.

I have discovered then that if the composting materials are held in a closed container and the air in the system only is recycled through the composting materials, then this provides significant benefits.

In other words by recirculating over a substantial time only the air and gaseous materials that already exist or are being formed within a closed circuit, then this has surprisingly beneficial results.

What has been discovered is that such a method can firstly result in reduced strength of obnoxious smell that has hitherto plagued disposal of animal bodies and it is not entirely clear as to why this happens.

Further, while it has been known that ammonia is a possible product of rotting protein materials it has been conventional for others to try to minimise this as it is considered to lead to a loss of nitrogen in eventual compost. In so far that any composting process uses replacement air even if some recirculation takes place then by maintaining recirculation only with the internal gases and no deliberately introduced outside air, the level of whatever is the gaseous discharge of the composting microflora will build up.

A further result of recirculation of only internal gaseous materials is that gases which may be warmed from the composting process will stay warm and will transfer that warmth through the mass of materials without outside refreshing air either generally or in parts cooling this.

Biological processes during composting are implicitly complex

What appears to happen is that ammonia as a gas builds up in concentration and rather than this being a disadvantage it has significant advantage in providing at the least assistance in sterilisation in respect of pathogens.

A significant advantage of ammonia build-up is that this material is effective in killing a broad spectrum of pathogens while not apparently inhibiting continued composting breakdown of the composting materials. Further, the microflora that is promoted seems to be such that odiferous output is relatively low.

Given that the composting materials also produce heat, there appears to be the additional benefit of both increased heat together with an ammonia buildup which provides for an effective better pathogen kill in relation to the composting materials.

In one form of this invention then, this can be said to reside in a method of treating materials to be composted which includes the steps of containing such materials within a closed container, pumping air into the container at one part of the contained body of material, and taking the air having passed through the material from the container so that it, and it only, will be substantially recirculated back to an introduction location of the material so that gaseous products of any decomposition of the materials will be kept within the container or its connected conduits.

In preference, there are means to effect a cyclic operation of such a pump so that it can be switched on and switched off over a decomposing period according to a pre-arranged program.

In preference, there is proposed a method of effecting composting of materials having a high protein content which includes the steps of containing such materials within a closed container, pumping air into the container at one part of the contained body of material, and taking the air having passed through the material from the container so that it will substantially recirculate back to an introduction location of the material only air and any gaseous compost product.

In preference, there is a biofilter in the pathway of such recirculating air.

In preference, such biofilter includes compost through which the air and gaseous product to be filtered is passed.

In preference, the inlet conduit into the container is arranged to introduce air to a top of the container so that the top of the container acts as a plenum with air at pressure then being pushed downward through a mass of material to be composted to collect apertures within a base of the conduit.

In preference, the base of the container includes a plurality of tubes having apertures therein which are laid to extend across a floor of the container and which are collectively connected to a conduit directed to an inlet of the pump.

In preference, the container includes an uppermost pivot supported lid.

In preference, the material to be composted comprises the bodies of dead poultry and the packing of the container includes a first covering of woodchips then successive layers of bodies of poultry, a layer of woodchips, a layer of poultry and so on.

Further, it has been discovered that if such recirculation occurs on a regular basis through a decomposing period which can be several weeks, nonetheless, such treatment is sufficient to maintain a dominance of aerobic bacteria with significant improved results.

By maintaining what is in effect a closed circuit arrangement, then any odours are substantially contained within the circulating equipment.

While various filters can be used to minimise the extent of odour that might be released when the doors are opened to either empty or reload the container, a filter material that has been found to be very useful has been compost which has been made more porous by having this distributed with pine chips.

In one form of the invention then it could be said to reside in a method of composting which includes the steps of placing the materials to be composted into a container, sealing the container and then blowing in a recycling manner substantially only the air and gases contained within the container through the composting materials for a period of time to collect and distribute ammonia sufficient to allow for a substantial buildup in concentration to a pathogen killing level of ammonia derived from the composting materials, and then maintaining such circulation for a sufficient period of time so as to effect a substantial pathogen kill in the composting material.

The method has the additional advantage that because the air and gases are simply recycled and are not bled out to atmosphere whether or not through a filter, means that there is no difficulty in having such a container in the vicinity of habitation.

It is well known that the putrid smell of rotting carcasses can be considered most offensive and is highly objectionable and will be objected to by many people.

A further advantage of the method described is that ammonia being recycled can of itself be separated and be used for other useful purposes such as conversion to fertilizer for instance by passing the nitrogen-rich gases through sulphuric acid to form ammonium sulphate as one example.

If the container is made of an uppermost lid that can be lifted to allow access into the body of the container, then the temporary opening of this lid and insertion of birds will not of itself substantially interfere with the process described.

The apparatus to perform the method includes a container, a lid that can assume two positions, one of which provides for an airtight seal with respect to the container, and means to effect to circulation of air where there is a manifold extending across a part of the container, which manifold is connected to air blowing means, and a further conduit from the airblowing means to effect direction of air to or from a further portion of the container which is opposite to that in which the manifold is located.

In preference, such an arrangement has the manifold extending across a bottom of the container, and air is introduced into a space at the top of the container between the lid and the composting materials, and there are means to effect a switching on and off of the air blower in accordance with a selected procedure.

Such a selected procedure may be to effect a blowing of the air and gases for a period of five minutes each hour or it may involve a longer period of blowing over different periods of time.

In preference, the composting materials are placed in layers with materials separating the respective layers which are porous.

In this way, air that is being pumped through the composting material, will as it passes successive layers redistribute in the porous intervening layer and pass through the next composting materials layer to the next more open or porous layer.

What we have now is that a container or bin of relatively substantial size such as a bin appropriate for transport on a truck without the need for excess width warnings, is placed at a convenient location for receiving composting materials such as dead poultry.

The poultry is placed in layers with intervening porous materials on to a lower manifold of pipes with a plurality of apertures throughout the length of the respective pipes to effect therefore a distributed passage of air and of course gathered gases.

Once loaded, the container has a lid that is openable from the top for loading of the chickens but thereafter closed in such a way as will provide an effective air seal.

From here, the program is set to circulate air on a regular basis but only on the basis that it is the air that is captured within the bin and any composting gases that are formed.

Because the material is in a closed container, and the air recirculating devices in preference are external but nonetheless sealed from allowing any additional outside air to be introduced.

By continuing this program for a period, the rotting carcasses will start to decompose and in an environment that is slowly changing from aerobic to anaerobic, it is found that there is a nitrogen buildup in the form of ammonia which is then transferred through all of the stored composting materials.

By recycling over a significant period of time without refreshing the air within the recycling path, results in a significant buildup of this alternate gas which has the significant beneficial advantage that this will then assist significantly in the pathogen kill off.

The invention then can also reside in the method of treatment of waste which includes the steps of placing the waste in a container, recirculating air through the waste held in the container so as to at least for a substantial period of time, recirculate only that air and any gaseous product of decomposition of the waste.

In preference, the container is such that it can be opened for introduction of and removal from waste from the container, and has a access lid which can close the container against any substantial air access outside of the container.

Preferably, the process described is continued until a substantial concentration of ammonia is built up within the circulating air whereby to effect a substantial kill off of any pathogens within the refuse.

In preference, the refuse includes materials having substantial protein content

For a better understanding of this invention it will now be described with relation to a preferred embodiment in which FIG. 1 illustrates an apparatus in accord with this invention providing the facilities for carrying out the method of the invention.

Figure 2:
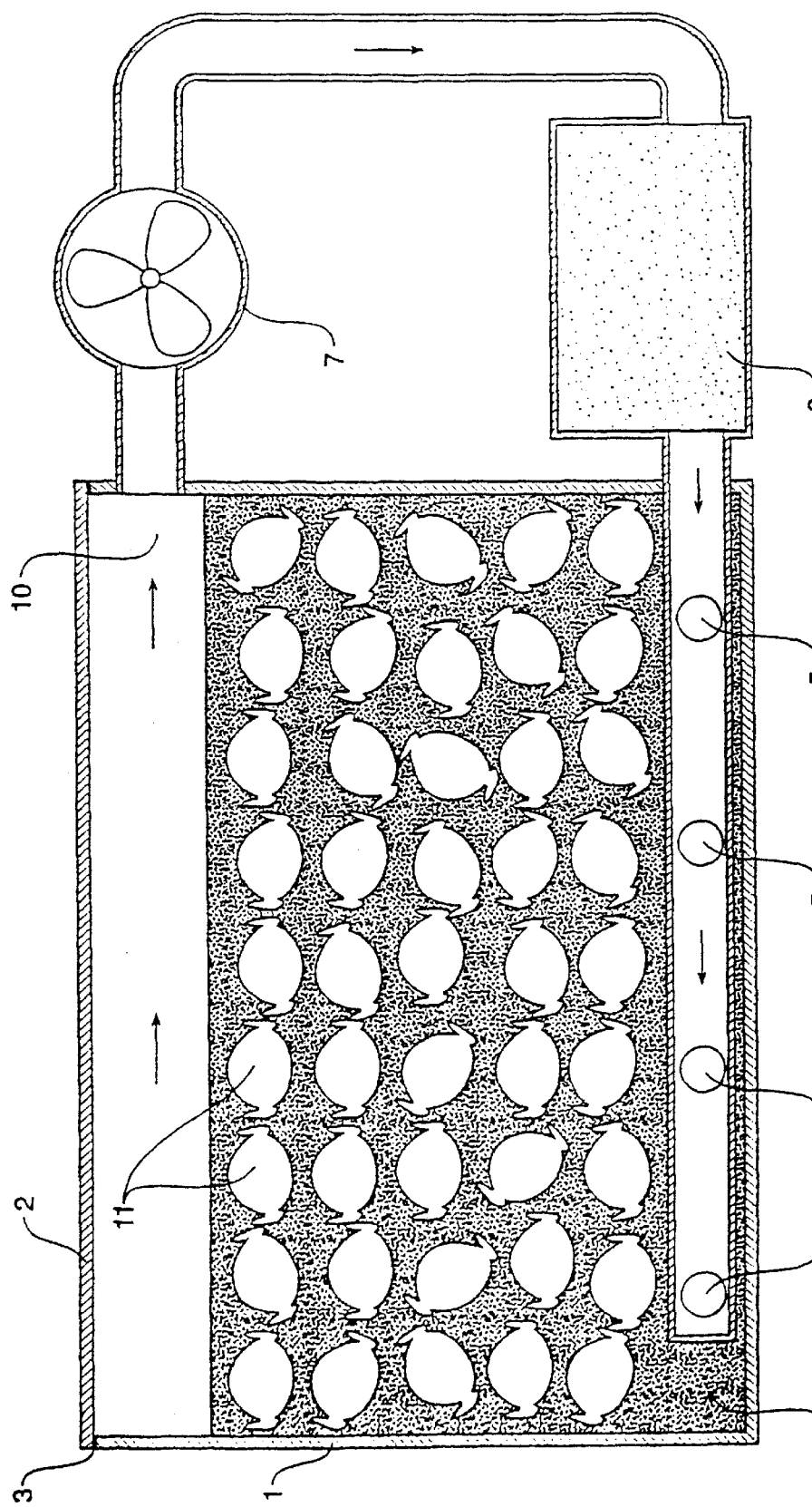

FIG. 2 is a cross sectional view through the decomposing mass illustrating arrangements for air flow from the top to the bottom and illustrating some of the details of the collector of the system within the container at the bottom.

Referring to the drawings, there is a container 1 which has an openable lid 2 which closes with respect to its surrounding perimeter by means of a resilient seal 3 so as to provide a substantially airtight closure with the container 1.

Across the bottom of the container 1 are a series of conduits 4 which have a plurality of holes passing through the walls thereof shown typically at 5.

The conduits 4 are collectively joined to a single exiting conduit 6 which feeds into a pump 7 and through a biofilter 8 back into a supply conduit 9.

The biofilter in this case is a smaller container which contains 50% pine chip and 50% compost which is mixed together to provide a sufficiently porous mix so that the air driven from the pump can effectively pass through this and then into the inputting conduit 9 into the top of the container 1 at 10 to thereby provide in a sense a plenum effect.

The poultry carcasses are shown typically at 11 and these are separated by layers of pine chips so that there is a lower most level of pine chips which surrounds the take-off conduits at 12 and then there are layers of dead carcasses and pine chips successively to an upper most surface.

In use, this arrangement then is operated by means which are not specifically shown which however cause the pump to drive air in a circulating manner from the plenum in the container through the rotting carcasses and pine chips to the collecting conduits at the bottom of the container, through the pump then through the filter and back into the plenum so that only the air and compost resulting gases are circulated over a substantial time.

In a further example the direction of the gas flow is from the lowermost manifold up through the layers to the uppermost plenum and then through the recirculating fan or pump.

A usual cycle of loading a container and proceeding through a composting program will be about 12 weeks with a first 6 weeks during which a first load of chickens will be placed a first layer of shavings and chicken litter. Apart from opening an upper lid to further load further chickens which will happen once a day the fan is operated so as to circulate only the air existing in the system and such gas products that are generated. These include ammonia.

A pattern of recirculation found to be effective is 2 hours on and one hour off. This then is continued for a full period of six weeks after which the material is then transported to a central depot.

In one example the level of ammonia is found to build over a first week to 50 parts per million and then over the next several weeks to continue to build up to and generally stay at 500 parts per million.

Pathogen kill off has been normally in previous composting attempts prior to this invention expected to occur with sustained high temperature alone. This temperature needs to be at least 55 degrees centigrade for three continuous days or at least 45 degrees centigrade for 12 continuous days. There is significant difficulty in ensuring that all parts of the material is kept at or above this temperature continuously and no obviously apparent way to ensure that it in fact has all been so affected. This self evidently leaves the situation as most unsatisfactory. It will now be seen that the value of significant ammonia levels is that this material will act in conjunction with temperature making a two pronged attack on the pathogens.

In trials so far, the kill off capacity of an environ in the container after approximately 7 days into a six week program has been such that a sample of *e-coli* survived less than three hours.

Further assistance to what is happening can perhaps be gained by information that the oxygen level in the same example reduced to 5.6% and CO2 to 12% as compared to fresh air having 21% oxygen and about 0.04% CO2.

Further any smell normally associated with composting of poultry was significantly reduced or at least changed so as to be nowhere near as obnoxious.

The level of ammonia is found generally to build up and be kept within a range of from 50 parts per million to 500 parts per million of the gaseous materials in the container including air.

In the embodiment in the trials conducted so far, it has been possible to open the lid of the container while the composting is in place and to place one's head within the upper plenum area without smelling a substantially obnoxious odour.

The method therefore allows for routine opening and closing of the lids to allow for addition of further carcasses. If this occurs while there is no recirculation occurring then this allows for introduction of fresh air but keeps to a minimum any loss in the concentrations of ammonia and CO2.

From further trials the following has been further observed.

In the container and associated closed connections in accord with this invention, temperatures have been found to be within the range of from 40 degrees centigrade to 60 degrees centigrade. The cooler temperatures are apparent during early stages of the composting process and at the sides of the container. Ammonia levels are 50 mg/L at an early stage and will generally reach 100 mg/L and more after a period. And after several additional levels of mortalities have been introduced. Levels of oxygen have been measured and stay generally within the range of from 5.3% to 16.6% of total volume of gases.

The tests for pathogen survival have so far involved the use of two surrogate bacterial pathogens *Escherichia coli,* and *Salmonella typhimurium*. These bacteria were introduced into the container as operating according to the invention and were placed in both sealed containers in the one case and unsealed containers in the other. These were placed at various locations through the container and the results were then assessed over a 24 hour period.

The sealed containers were sealed against gas so that these will act as a control.

Reduction in cell count from 10 to the eighth to below detection in respect of both bacteria types where these were in the open container at both 50 degrees centigrade and 60 degrees centigrade. Reductions observed were at least ten fold higher with exposure to both temperature and gases compared to exposure to temperature alone.

For example, there were still 300 viable cells of *E-COLI* after 6 hours at 60 C. in the sealed tubes whereas there were no detectable cells in the open tube after the same time and same temperature.

At lower temperatures also such as 36 degrees centigrade after 24 hours there were no viable cells detectable in the open tubes for both species of bacteria.

What will now be seen is that this method of composting is different from any other method hitherto known to the applicant insofar that hitherto the objective has been to maintain what might be termed an aerobic composting process.

This has meant that there has been a process whereby sufficient oxygen from time to time is introduced into any of the recirculating gases to maintain this aerobic effect.

It is generally known that anaerobic development produces obnoxious gases and is generally considered to be undesirable.

This invention on its face value therefore goes directly against current logic.

It proposes substantially no introduction at all of fresh gas which of course includes oxygen through the composting process.

The discovery has been that if the recirculation is caused to occur over a period of time without introduction of further fresh air, then in the case of protein degradation, there is an ammonia gas build up which provides very significant advantages if kept at reasonable levels.

Whereas hitherto, the prior art has taught that except for very short periods at a commencement of composting, closed recirculation should be used in order to assist in heating of the material especially in cold climates to start the composting process, we are now teaching that you go against all of the previous logic and you will find dramatically improved results.

The reason for this is the ammonia build up does occur relatively quickly and in conjunction with increased temperatures has a very significant effect on killing pathogens.

Further, for reasons which are not entirely clear, very noxious odours are not built up over time perhaps because the ammonia levels reduces the bacteria causing this or because the ammonia itself masks the odorous gases and reduces their apparent impact.

It is certainly illogical given the prior art to consider pure maintenance of recycling especially with animal bodies which have high protein.

What is claimed is:

1. A method of anaerobically treating high-protein materials to be composted which includes the steps of containing such materials within a closed container, pumping air into the container at one part of the contained body of material, and taking the air having passed through the material from the container so that it will substantially recirculate without removal of ammonia back to an introduction location of the material, wherein in the circulation heat energy of the air is conserved.

2. A method of treating materials to be composted as in claim 1 further characterized in that there are conduits attached at upper and lower parts of the container which are also coupled to an air pump so that the air pump will cause the air to be extracted through a lower conduit and to be introduced back into the container through an upper conduit.

3. A method of treating materials to be composted as in claim 1 or claim 2 further characterized in that the recirculation is effected from time to time through the period of composting, wherein the recirculation is effected about five minutes per hour.

4. A method of treating materials to be composted as in claim 1 further characterized in that the recirculating air is passed through a biofilter in the pathway of such recirculating gases.

5. A method of treating materials to be composted as in claim 4 further characterized in that the biofilter includes compost through which the air to be filtered is passed.

6. A method of treating materials to be composted as in the claim 1 further characterized in that the step of containing the materials within a closed container includes:

effecting a first covering of woodchips; then adding successively a layer of bodies of the material to be composted and a layer of absorbing woodchips.

7. A method of composting as in claim 1 having a cycle of loading a container and proceeding through a composting program of about 6 weeks duration during which a first load of chickens will be placed a first layer of shavings and chicken litter and then apart from opening an upper lid to further load further chickens on an occasional basis on an approximately once per day, operating a pump so as to circulate only the air existing in the system and such gas products that are generated.

8. A method of composting as in claim 7 further characterized in that the process is arranged such that a level of ammonia will be built up and maintained during the period of the composting to be at the least to a level within the air and gas compost products which is in excess of 50 parts of ammonia per million parts of total gaseous materials including air in the container.

9. A method of composting as in claim 7 further characterized in that the process is arranged such that a level of ammonia will be built up and maintained during the period of the composting to be at the least to a level within the air and gas compost products which is in a range of from 50 to 500 parts of ammonia per million parts of total gaseous materials including air in the container.

10. A method of anaerobically composting materials which are high in protein content including the steps of:

holding the composting materials in a substantially closed system; and recycling through the material substantially only the air and any resultant gaseous give off from the composting materials; wherein heat energy and ammonia content are conserved in during recycling; and wherein ammonia levels are raised to a range of about 50 parts per million to about 500 parts per million;

wherein a temperature of the system ranges from about 40 to about 60 degrees centigrade; and wherein oxygen levels are reduced from ambient to a range of about 5% to about 17% of the total volume of gases in the system.

11. A method as in claim 10 further characterized in that there are means to effect a cyclic operation of a pump so that it can be switched on and switched off over a composting period according to a pre-arranged program, comprising a recirculation pattern of about two hours on and one hour off, for a period of about six weeks.

12. A method of anaerobic composting of animal carcasses which includes the steps of placing the materials to be composted into a container, sealing the container and then blowing in a recycling manner substantially only the air and gases contained within the container through the composting materials for a period of time to collect and distribute ammonia sufficient to allow for a substantial buildup in concentration to a pathogen killing level of ammonia derived from the composting materials, and then maintaining such circulation for a sufficient period of time so as to effect a substantial pathogen kill in the composting material;

wherein oxygen levels are reduced to about 5% to about 17% of the total volume of gases in the system.

13. A method as in claim 12 further characterized in that the composting materials are placed in layers with materials separating the respective layers which are porous.

14. A process of killing pathogens in a composting system comprising the steps of:

placing unprocessed high-protein materials to be composted in a container having a lid adapted to form an airtight seal;

recirculating only the gaseous contents of the system through the materials to be composted for a predetermined duration, thereby providing an anaerobic environment for decomposition of the materials;

wherein the ammonia content of the gaseous contents is raised to at least 50 parts per million parts of gaseous material, the oxygen content is reduced to below about 17% of the volume of the gaseous contents, and the carbon dioxide content is increased up to about 12% of the volume of the gaseous contents; and wherein the process produces a substantial pathogen kill in the material to be composted, and substantially reduces obnoxious odors associated therewith.

\* \* \* \* \*